(12) United States Patent
Ueda (10) Patent No.: US 11,327,499 B2
(45) Date of Patent: May 10, 2022

(54) VEHICLE CONTROL SYSTEM

(71) Applicant: Toyota Jidosha Kabushiki Kaisha, Toyota (JP)

(72) Inventor: Kazuhiko Ueda, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 251 days.

(21) Appl. No.: 16/661,520

(22) Filed: Oct. 23, 2019

(65) Prior Publication Data
US 2020/0142423 A1 May 7, 2020

(30) Foreign Application Priority Data

Nov. 1, 2018 (JP) .............................. JP2018-206769

(51) Int. Cl.
| | |
|---|---|
| *B60T 8/32* | (2006.01) |
| *G05D 1/00* | (2006.01) |
| *G06F 7/00* | (2006.01) |
| *G06F 17/00* | (2019.01) |
| *G05D 1/02* | (2020.01) |
| *B60Q 1/08* | (2006.01) |
| *G06V 20/56* | (2022.01) |

(52) U.S. Cl.
CPC ........... *G05D 1/0223* (2013.01); *B60Q 1/085* (2013.01); *G05D 1/0088* (2013.01); *G06V 20/56* (2022.01); *G05D 2201/0213* (2013.01)

(58) Field of Classification Search
CPC ............... G05D 1/0223; G05D 1/0088; G05D 2201/0213; B60Q 1/085; G06K 9/00791
USPC ........................................................ 701/93
See application file for complete search history.

(56) References Cited

U.S. PATENT DOCUMENTS

| | | | | |
|---|---|---|---|---|
| 2012/0083982 A1* | 4/2012 | Bonefas | ............... | G05D 1/0223 701/70 |
| 2016/0009218 A1* | 1/2016 | Nakashima | ............ | B60Q 1/085 701/36 |
| 2016/0132745 A1* | 5/2016 | Falb | ..................... | G06K 9/6201 348/148 |

FOREIGN PATENT DOCUMENTS

| | | | |
|---|---|---|---|
| JP | 2001-154733 A | 6/2001 | |
| JP | 2016-016780 A | 2/2016 | |
| WO | WO-2017022051 A | * 2/2017 | ............... G09F 9/00 |

OTHER PUBLICATIONS

English Translation for WO2017/022051A1 (Year: 2021).*

* cited by examiner

*Primary Examiner* — Mahmoud S Ismail
(74) *Attorney, Agent, or Firm* — Dinsmore & Shohl LLP (57) ABSTRACT

A vehicle control system that is mounted in a vehicle includes a camera and an autonomous driving control device. The camera images a situation in front of the vehicle to acquire camera imaging information indicating an imaging result. The autonomous driving control device controls autonomous driving of the vehicle based on the camera imaging information and decides a maximum speed of the vehicle in the middle of the autonomous driving. In more detail, the autonomous driving control device estimates a maximum visible distance of the camera based on the camera imaging information. Then, the autonomous driving control device variably sets the maximum speed according to the maximum visible distance such that the maximum speed in a case where the maximum visible distance is long becomes higher than the maximum speed in a case where the maximum visible distance is short.

7 Claims, 9 Drawing Sheets

| LIGHTING STATE OF HEADLIGHT | Dmax ACQUISITION METHOD |
|---|---|
| OFF | FIRST MODE |
| LOW BEAM | FIRST MODE |
| HIGH BEAM | SECOND MODE (Dmax = 100m) |
| HIGH BEAM & BAD WEATHER | FIRST MODE |

FIG. 9

VEHICLE CONTROL SYSTEM

CROSS-REFERENCE TO RELATED APPLICATIONS

This application claims priority to Japanese Patent Application No. 2018-206769 filed on Nov. 1, 2018, which is incorporated herein by reference in its entirety including the specification, drawings and abstract.

BACKGROUND

1. Technical Field

The present disclosure relates to a vehicle control system that controls autonomous driving of a vehicle.

2. Description of Related Art

Japanese Unexamined Patent Application Publication No. 2001-154733 (JP 2001-154733 A) discloses an autonomous traveling control device for a vehicle. The autonomous traveling control device generates a speed pattern of the vehicle to a predetermined position based on an upper limit speed pattern. The upper limit speed pattern is set in advance for each of various traveling environments (straight road, curve, tunnel, slope, and congestion situation).

Japanese Unexamined Patent Application Publication No. 2016-016780 (JP 2016-016780 A) discloses a lighting device for a vehicle. The lighting device for a vehicle includes a headlight that irradiates in front of the vehicle, and a controller that controls the headlight. The controller automatically controls a light distribution of the headlight according to a situation around the vehicle. In particular, the controller automatically controls the light distribution of the headlight based on a weather state.

SUMMARY

A maximum speed that is permitted in a vehicle during autonomous driving is considered. In general, in the nighttime, a situation in front of the vehicle is hardly recognized compared to the daytime. Accordingly, it is considered that a maximum speed in the nighttime is set to be lower than a maximum speed in the daytime. However, in a case where the maximum speed at nighttime is reduced uniformly, the traveling efficiency of the vehicle is degraded more than needed.

The disclosure provides a technique capable of suppressing needless degradation of traveling efficiency of a vehicle during autonomous driving.

An aspect of the disclosure relates to a vehicle control system that is mounted in a vehicle. The vehicle control system includes a camera and an autonomous driving control device. The camera is configured to image a situation in front of the vehicle to acquire camera imaging information indicating an imaging result. The autonomous driving control device is configured to control autonomous driving of the vehicle based on the camera imaging information and decide a maximum speed of the vehicle in the middle of the autonomous driving. The autonomous driving control device is configured to estimate a maximum visible distance of the camera based on the camera imaging information and variably set the maximum speed according to the maximum visible distance such that the maximum speed in a case where the maximum visible distance is long becomes higher than the maximum speed in a case where the maximum visible distance is short.

The vehicle control system according to the aspect may further include a headlight control device configured to control a lighting state of a headlight of the vehicle. The headlight control device may be configured to send a lighting state signal indicating the lighting state to the autonomous driving control device. The autonomous driving control device may be configured to estimate the maximum visible distance based on the camera imaging information in a first mode, set the maximum visible distance to a predetermined value without using the camera imaging information in a second mode, and switch between the first mode and the second mode according to the lighting state.

In the vehicle control system according to the aspect, the autonomous driving control device may be configured to select the first mode in a case where the lighting state is non-lighted or a low beam.

The vehicle control system according to the aspect may further include an information acquisition device configured to acquire driving environment information indicating a driving environment of the vehicle. The autonomous driving control device may be configured to determine whether or not a weather state around the vehicle is a bad weather state based on the driving environment information. The autonomous driving control device may be configured to select the first mode in a case where the lighting state is a high beam, and the weather state is the bad weather state. The autonomous driving control device may be configured to select the second mode in a case where the lighting state is the high beam, and the weather state is not the bad weather state.

In the vehicle control system according to the aspect, the predetermined value may be an irradiation distance of a high beam.

According to the aspect, the autonomous driving control device variably sets the maximum speed of the vehicle during the autonomous driving according to the maximum visible distance of the camera. The maximum speed in a case where the maximum visible distance is long becomes higher than the maximum speed in a case where the maximum visible distance is short. That is, degradation of the maximum speed more than needed is suppressed, regardless of high visibility. Accordingly, needless degradation of the traveling efficiency of the vehicle during the autonomous driving is suppressed.

According to the aspect, a method of acquiring the maximum visible distance includes the first mode using the camera imaging information and the second mode without using the camera imaging information. The autonomous driving control device switches between the first mode and the second mode according to the lighting state of the headlight. With this, it is possible to acquire the maximum visible distance more flexibly.

According to the aspect, a mode suitable for a case where the lighting state of the headlight is non-lighted or the low beam is selected.

According to the aspect, a mode suitable for a case where the lighting state of the headlight is the high beam is selected.

According to the aspect, in a case where the lighting state of the headlight is the high beam, and the weather state is not the bad weather state, the irradiation distance of the high beam is regarded as the maximum visible distance. That is, the irradiation distance of the high beam, instead of an estimated value based on the camera imaging information, is used as the maximum visible distance. Accordingly, a probability (accuracy, reliability) of the maximum visible distance is improved. In a case where the probability of the maximum visible distance is improved, the setting accuracy of the maximum speed is also improved. This contributes to improvement of the accuracy of autonomous driving control.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of the disclosure will be described referring to the accompanying drawings.

1. First Embodiment 1-1. Configuration of Vehicle Control System

Figure 1:
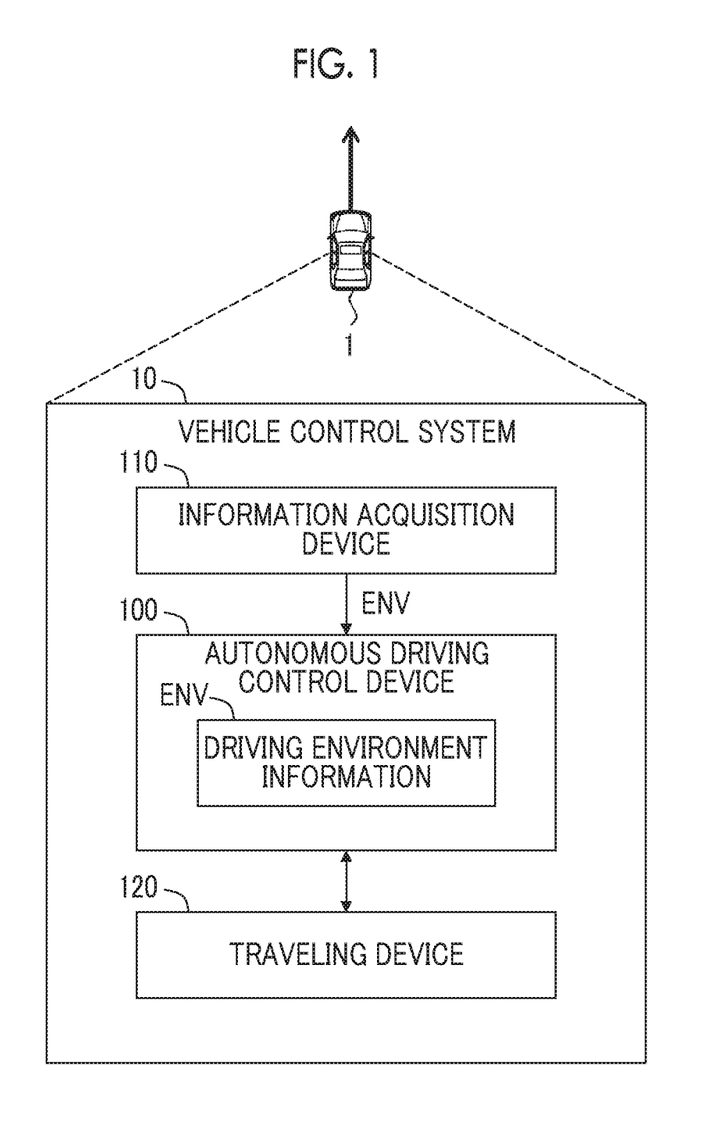
FIG. 1 is a block diagram schematically showing the configuration of a vehicle control system according to a first embodiment.

FIG. 1 is a block diagram schematically showing the configuration of a vehicle control system 10 according to a first embodiment. The vehicle control system 10 is mounted in a vehicle 1 and controls the vehicle 1. In particular, the vehicle control system 10 controls autonomous driving of the vehicle 1. In more detail, the vehicle control system 10 includes an autonomous driving control device 100, an information acquisition device 110, and a traveling device 120.

The autonomous driving control device 100 is a controller that controls the autonomous driving of the vehicle 1. Typically, the autonomous driving control device 100 is a microcomputer including a processor, a storage device, and an I/O interface. The autonomous driving control device 100 is also referred to as an electronic control unit (ECU). The processor executes a control program stored in the storage device, whereby various kinds of processing in the autonomous driving control device 100 are implemented.

The information acquisition device 110 acquires information needed for the autonomous driving of the vehicle 1. Information needed for the autonomous driving is information indicating a driving environment of the vehicle 1, and is hereinafter, referred to as "driving environment information ENV".

Figure 2:
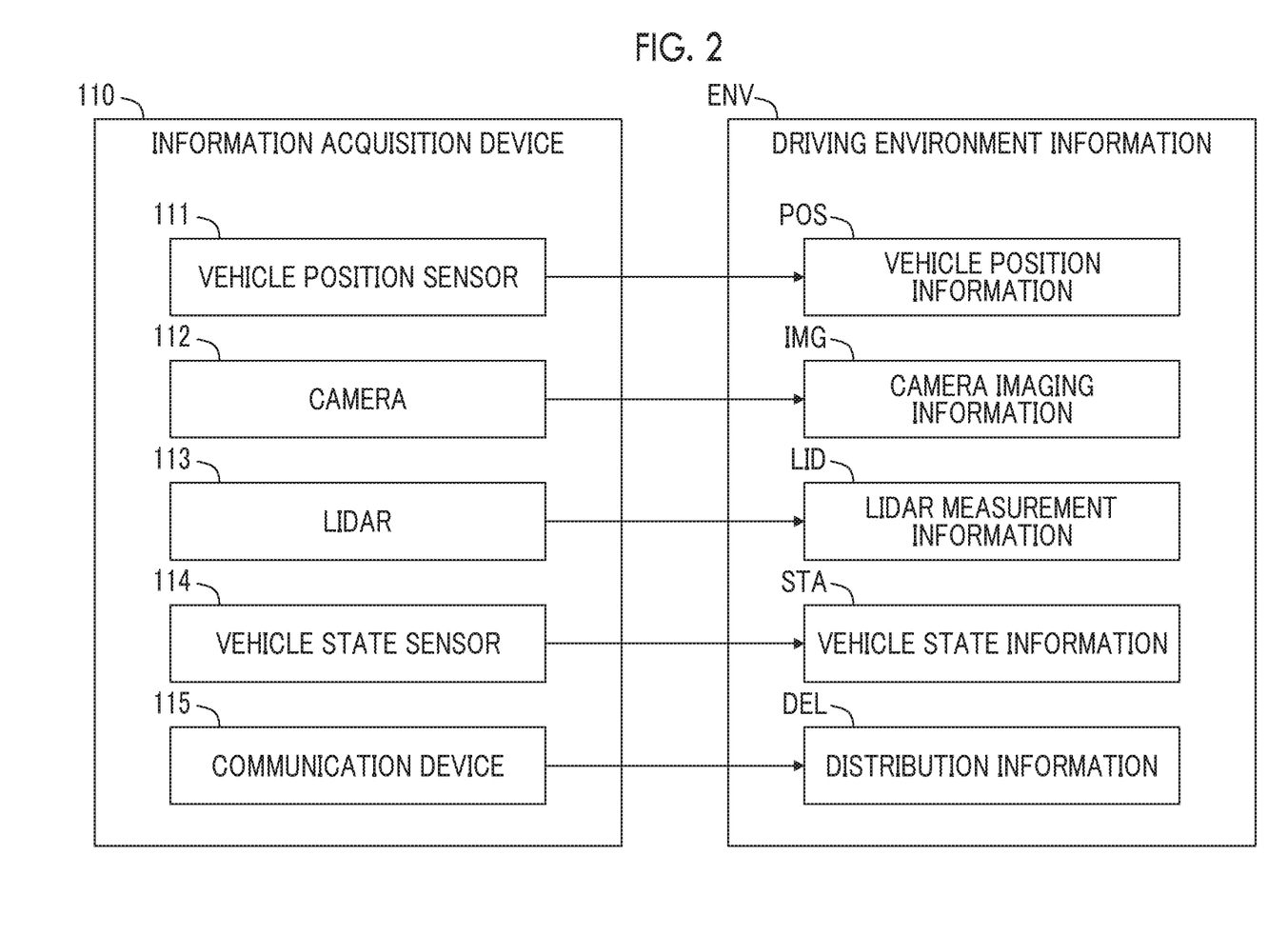
FIG. 2 is a block diagram showing an example of an information acquisition device and driving environment information according to the first embodiment.

FIG. 2 is a block diagram showing examples of the information acquisition device 110 and the driving environment information ENV. The information acquisition device 110 includes a vehicle position sensor 111, a camera 112, laser imaging detection and ranging (LIDAR) 113, a vehicle state sensor 114, and a communication device 115. The driving environment information ENV includes vehicle position information POS, camera imaging information IMG, lidar measurement information LID, vehicle state information STA, and distribution information DEL.

The vehicle position sensor 111 detects a position and an azimuth of the vehicle 1 and acquires the vehicle position information POS indicating the position and the azimuth. For example, the vehicle position sensor 111 includes a global positioning system (GPS) sensor. The GPS sensor receives signals transmitted from a plurality of GPS satellites and calculates the position and the azimuth of the vehicle 1 based on the received signals.

The camera 112 images a situation surrounding the vehicle 1 and acquires the camera imaging information IMG indicating an imaging result. The camera 112 is provided to image at least a situation in front of the vehicle 1. The camera 112 is, for example, a stereo camera.

The lidar 113 measures a situation surrounding the vehicle 1 using a laser beam and acquires the lidar measurement information LID indicating a measurement result. The lidar 113 is provided to measure at least a situation in front of the vehicle 1.

The vehicle state sensor 114 detects a state of the vehicle 1 and acquires the vehicle state information STA indicating the state of the vehicle 1. The state of the vehicle 1 includes a speed (vehicle speed), an acceleration, a yaw rate, and the like of the vehicle 1. Furthermore, the state of the vehicle 1 includes a driving operation an (accelerator operation, a brake operation, and a steering operation) of a driver of the vehicle 1. In, addition, the state of the vehicle 1 may include an operation state of a windshield wiper.

The communication device 115 performs communication with the outside of the vehicle 1. For example, the communication device 115 performs communication with an information distribution server through a communication network. The communication device 115 may perform vehicle-to-vehicle communication (V2V communication) with peripheral vehicles. The distribution information DEL is information that is obtained through the communication device 115. For example, the distribution information DEL includes weather information or traffic information.

The traveling device 120 includes a steering device, a drive device, and a braking device. The steering device turns wheels. The drive device is a power source that generates drive power. As the drive device, an electric motor or an engine is exemplified. The braking device generates braking force.

The autonomous driving control device 100 controls the autonomous driving of the vehicle 1 based on the driving environment information ENV. For example, the autonomous driving control device 100 detects an object (target) surrounding the vehicle 1 based on the camera imaging information IMG. As the object surrounding the vehicle 1, peripheral vehicles, pedestrians, roadside objects, signs, white lines, and the like are exemplified. The autonomous driving control device 100 may detect an object based on the camera imaging information IMG and the lidar measurement information LID in combination. The autonomous driving control device 100 calculates a relative position and a relative speed of a detected object based on the camera imaging information IMG or the lidar measurement information LID.

In addition, the autonomous driving control device 100 generates a traveling plan of the vehicle 1 based on an object detection result, the driving environment information ENV, and map information (not shown). The traveling plan includes, for example, a target path, a speed plan, a plan for lane change, and the like. The autonomous driving control device 100 performs vehicle traveling control such that the vehicle 1 travels according to the traveling plan. The vehicle traveling control includes steering control, acceleration control, and deceleration control. The autonomous driving control device 100 appropriately operates the traveling device 120 (the steering device, the drive device, and the braking device) to perform the steering control, the acceleration control and the deceleration control.

The autonomous driving control device 100 decides a maximum speed Vmax of the vehicle 1 in the middle of the autonomous driving. The autonomous driving control device 100 performs autonomous driving control such that the speed of the vehicle 1 does not exceed the maximum speed Vmax. Hereinafter, a decision method of the maximum speed Vmax according to the embodiment will be described in detail.

1-2. Decision Method of Maximum Speed During Autonomous Driving

In general, at the nighttime, a situation in front of the vehicle 1 is hardly recognized compared to the daytime. That is, an object detection range based on the camera imaging information IMG tends to be narrower at the nighttime than at the daytime. Accordingly, it is considered that the maximum speed Vmax at the nighttime is set to be lower than the maximum speed Vmax at the daytime. However, even at the nighttime, for example, visibility is high in a section where the number of streetlights is large. Thus, in a case where the maximum speed Vmax at the nighttime is decreased uniformly, the traveling efficiency of the vehicle 1 is degraded more than needed.

Figure 3:
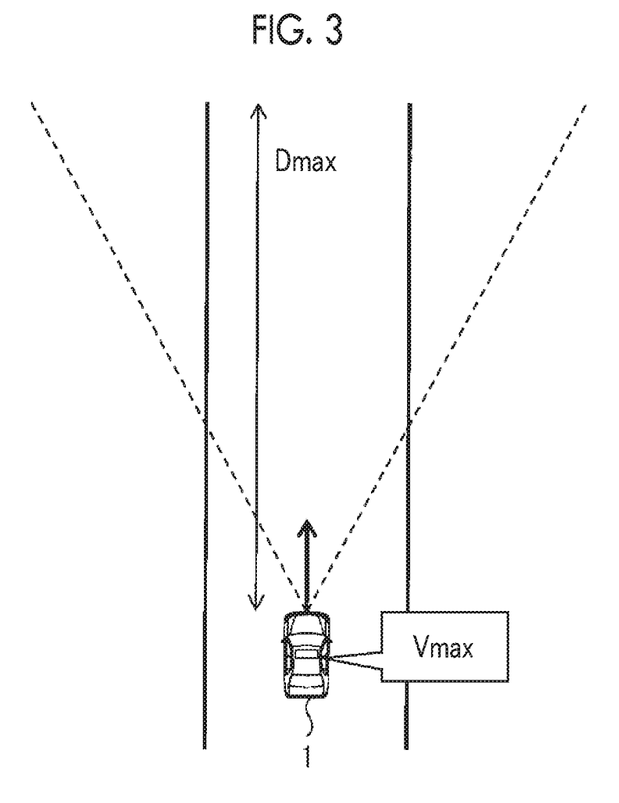
FIG. 3 is a conceptual diagram illustrating a decision method of a maximum speed of a vehicle during autonomous driving according to the first embodiment.

Therefore, in the embodiment, attention is focused on a "maximum visible distance Dmax" shown in FIG. 3. The maximum visible distance Dmax is a maximum distance visible by the camera 112 that images the situation in front of the vehicle 1. It may be said that the maximum visible distance Dmax of the camera 112 is a parameter quantitatively representing visibility. The maximum visible distance Dmax can be estimated based on the camera imaging information IMG. For example, a distance to an object farthest from the vehicle 1 among objects detected based on the camera imaging information IMG is estimated as the maximum visible distance Dmax.

Figure 4:
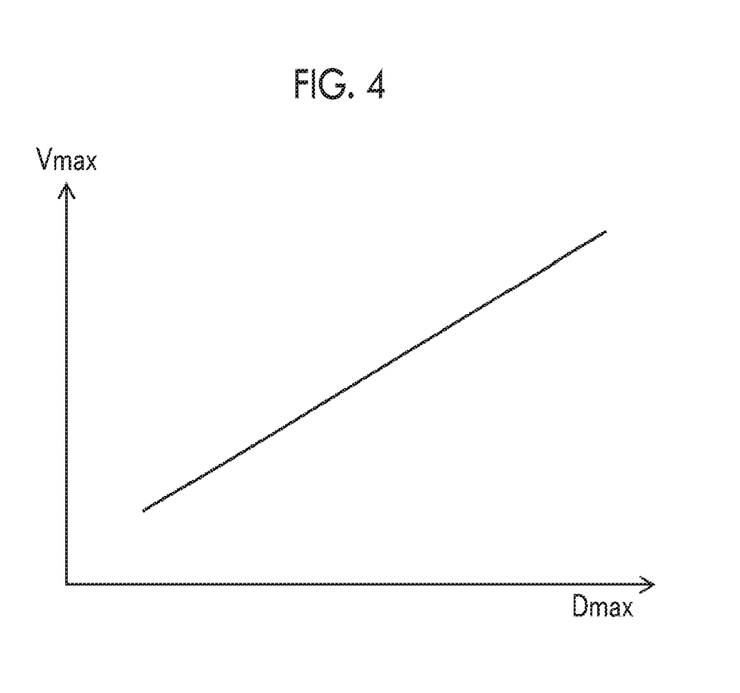
FIG. 4 is a conceptual diagram showing an example of the relationship between a maximum visible distance and the maximum speed according to the first embodiment.
Figure 5:
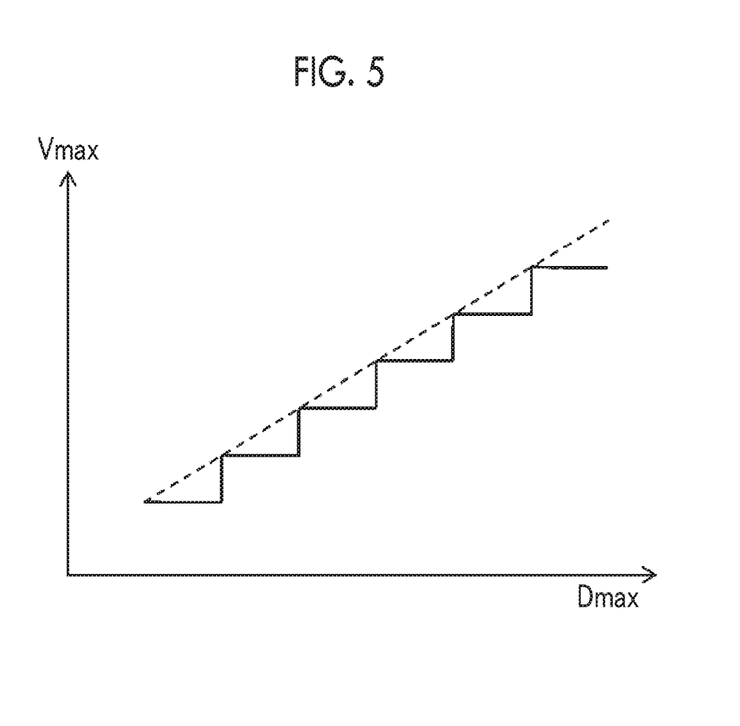
FIG. 5 is a conceptual diagram showing another example of the relationship between the maximum visible distance and the maximum speed according to the first embodiment.

According to the embodiment, the maximum speed Vmax of the vehicle 1 during the autonomous driving is variably set according to the maximum visible distance Dmax. In more detail, in comparison of a case where the maximum visible distance Dmax is long and a case where the maximum visible distance Dmax is short, the maximum speed Vmax becomes higher in a case where the maximum visible distance Dmax is long. For example, as shown in FIG. 4, the longer the maximum visible distance Dmax, the higher the maximum speed Vmax. As another example, as shown in FIG. 5, the maximum speed Vmax may increase in a stepwise manner with an increase in the maximum visible distance Dmax.

Note that an absolute value of the maximum speed Vmax is decided based on the maximum visible distance Dmax and a limit value of a deceleration. The limit value of the deceleration is set to a value in which an occupant of the vehicle 1 does not feel uneasiness. For example, a case where an object is detected at the maximum visible distance Dmax when the vehicle 1 is traveling at the maximum speed Vmax is considered. The absolute value of the maximum speed Vmax is set such that the deceleration needed to avoid collision with the obstacle does not exceed the limit value.

1-3. Processing in Vehicle Control System

Figure 6:
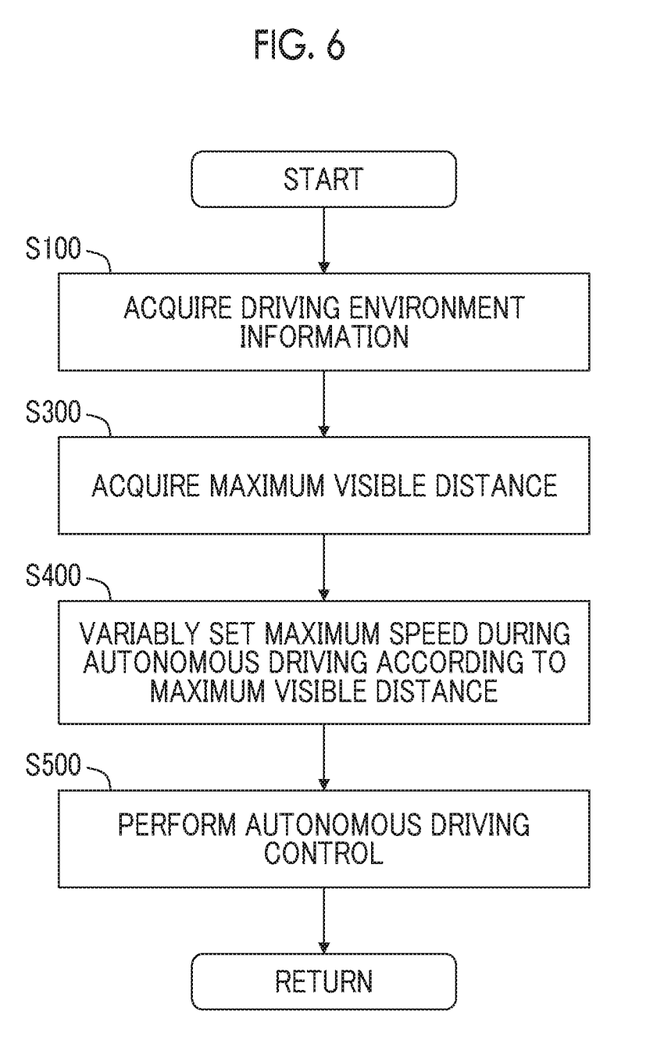
FIG. 6 is a flowchart showing processing in the vehicle control system according to the first embodiment.

FIG. 6 is a flowchart showing processing in the vehicle control system 10 according to the embodiment. A processing flow shown in FIG. 6 is executed repeatedly in each given cycle.

In Step S100, the information acquisition device 110 acquires the driving environment information ENV. The autonomous driving control device 100 acquires the driving environment information ENV from the information acquisition device 110 and stores the driving environment information ENV in the storage device.

In Step S300, the autonomous driving control device 100 acquires the maximum visible distance Dmax of the camera 112 based on the driving environment information ENV. In more detail, the autonomous driving control device 100 estimates the maximum visible distance Dmax based on the camera imaging information IMG. For example, the distance to the object farthest from the vehicle 1 among the objects detected based on the camera imaging information IMG is estimated as the maximum visible distance Dmax.

In Step S400, the autonomous driving control device 100 variably sets the maximum speed Vmax during the autonomous driving according to the maximum visible distance Dmax. In more detail, the autonomous driving control device 100 variably sets the maximum speed Vmax such that the maximum speed Vmax in a case where the maximum visible distance Dmax is long is higher than the maximum speed Vmax in a case where the maximum visible distance Dmax is short (see FIGS. 4 and 5).

In Step S500, the autonomous driving control device 100 performs the autonomous driving control based on the driving environment information ENV. In this case, the autonomous driving control device 100 performs the autonomous driving control such that the speed of the vehicle 1 does not exceed the maximum speed Vmax.

1-4. Effects

As described above, according to the embodiment, the autonomous driving control device 100 variably sets the maximum speed Vmax of the vehicle 1 during the autonomous driving according to the maximum visible distance Dmax of the camera 112. The maximum speed Vmax in a case where the maximum visible distance Dmax is long is higher than the maximum speed Vmax in a case where the maximum visible distance Dmax is short. That is, the maximum speed Vmax more than needed is restrained from being lowered nevertheless visibility is high. Accordingly, the traveling efficiency of the vehicle 1 during the autonomous driving is restrained from being degraded needlessly. In a case where visibility is high, it is possible to make the vehicle 1 efficiently travel at the high maximum speed Vmax according to high visibility. In a case where visibility is low, since the maximum speed Vmax is sufficiently lowered, safety is secured. According to the embodiment, it is can be said that the performance of the autonomous driving control is effectively exhibited.

2. Second Embodiment

2-1. Configuration of Vehicle Control System

Figure 7:
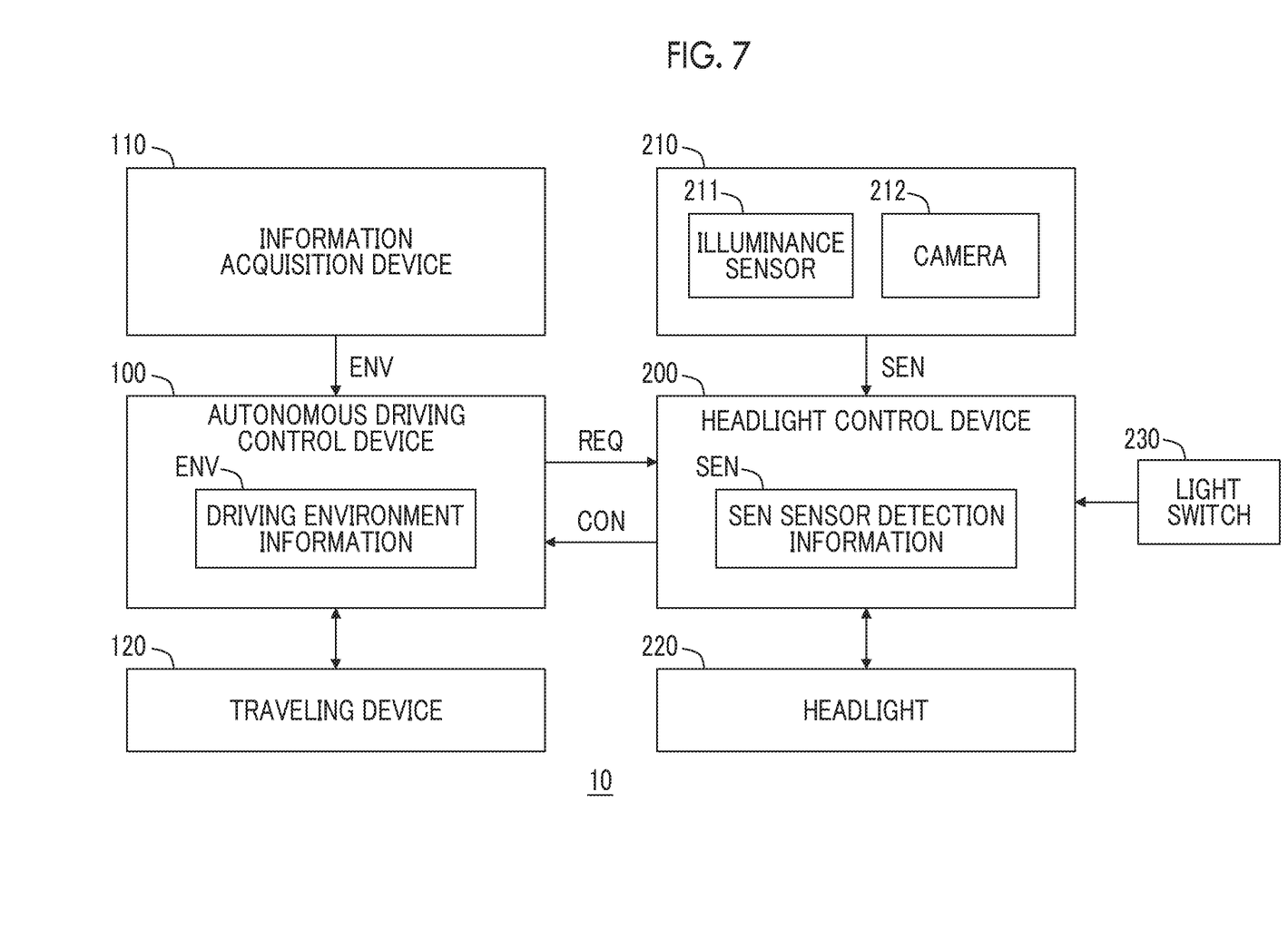
FIG. 7 is a block diagram schematically showing the configuration of a vehicle control system according to a second embodiment.

FIG. 7 is a block diagram schematically showing the configuration of a vehicle control system 10 according to a second embodiment. Description overlapping the first embodiment (FIG. 1) will not be repeated. The vehicle control system 10 shown in FIG. 7 further includes a headlight control device 200 and a sensor group 210 in addition to the configuration shown in FIG. 1.

The headlight control device 200 is a controller that controls a lighting state of a headlight 220 of the vehicle 1. Typically, the headlight control device 200 is a microcomputer including a processor, a storage device, and an I/O interface. The headlight control device 200 is also referred to as an ECU. The processor executes a control program stored in the storage device, whereby various kinds of processing in the headlight control device 200 are implemented.

The sensor group 210 includes an illuminance sensor 211 and a camera 212. The illuminance sensor 211 is provided to detect illuminance surrounding the vehicle 1. The camera 212 is provided to image a situation in front of the vehicle 1. The camera 212 may be the same as or different from the camera 112 of the information acquisition device 110.

Sensor detection information SEN is information that is detected by the sensor group 210. The sensor detection information SEN includes illuminance that is detected by the illuminance sensor 211. Furthermore, the sensor detection information SEN includes camera imaging information indicating an imaging result of the camera 212. The sensor detection information SEN is stored in the storage device and the headlight control device 200 and is appropriately used.

A light switch 230 is a member that is used by the driver of the vehicle 1 to designate the lighting state of the headlight 220. The driver can switch between on and off and between a high beam and a low beam (light distribution state) of the headlight 220 using the light switch 230. The headlight control device 200 controls the lighting state of the headlight 220 according to a designation of the driver through the light switch 230.

The driver may designate an "AUTO mode". In a case where the AUTO mode is designated, the headlight control device 200 automatically controls the lighting state of the headlight 220 based on the sensor detection information SEN.

For example, the headlight control device 200 automatically turns on or off the headlight 220 based on illuminance surrounding the vehicle 1. Specifically, in a case where illuminance is less than a first threshold, the headlight control device 200 automatically turns on (light) the headlight 220. In a case where illuminance is equal to or greater than a second threshold, the headlight control device 200 automatically turns off (light out) the headlight 220.

As another example, the headlight control device 200 automatically switches between the high beam and the low beam based on the camera imaging information. For example, the headlight control device 200 detects a headlight of a preceding vehicle or a taillight of an oncoming vehicle based on the camera imaging information. In a case where a preceding vehicle or an oncoming vehicle is present, the headlight control device 200 automatically switches the lighting state of the headlight 220 to the low beam. In a case where neither a preceding vehicle nor an oncoming vehicle is present, the headlight control device 200 automatically switches the lighting state of the headlight 220 to the high beam. As still another example, the headlight control device 200 may shield solely the high beam toward a preceding vehicle or an oncoming vehicle.

The autonomous driving control device 100 and the headlight control device 200 are connected to perform communication with each other through a controller area network (CAN). The autonomous driving control device 100 can perform the autonomous driving control in collaboration (cooperation) with the headlight control device 200.

For example, in performing the autonomous driving control, the autonomous driving control device 100 sends a request signal REQ for requesting the above-described AUTO mode to the headlight control device 200. The headlight control device 200 automatically performs switching between on and off and between the high beam and the low beam of the headlight 220 in response to the request signal REQ. Furthermore, the headlight control device 200 sends a lighting state signal CON indicating the lighting state of the headlight 220 to the autonomous driving control device 100. The lighting state of the headlight 220 includes on and off, and the high beam and the low beam (light distribution state). In a case where an abnormality occurs in the headlight control device 200 or the headlight 220, the lighting state signal CON may give notification of the occurrence of the abnormality.

According to the embodiment, the autonomous driving control device 100 decides the maximum speed Vmax of the vehicle 1 in the middle of the autonomous driving also taking the lighting state of the headlight 220 into consideration. Hereinafter, a decision method of the maximum speed Vmax according to the embodiment will be described in detail.

2-2. Decision Method of Maximum Speed During Autonomous Driving

According to the embodiment, as an acquisition method of the maximum visible distance Dmax, at least a first mode and a second mode are prepared. With this, it is possible to more flexibly acquire the maximum visible distance Dmax.

In the first mode, the maximum visible distance Dmax is estimated based on the camera imaging information IMG. The same applies to the first embodiment described above. For example, the distance to the object farthest from the vehicle 1 among the objects detected based on the camera imaging information IMG is estimated as the maximum visible distance Dmax. However, the farther the object from the vehicle 1, the lower the detection position accuracy of an object detected based on the camera imaging information IMG. Accordingly, in a case of the first mode, there is a concern that the longer the maximum visible distance Dmax, the lower the estimation accuracy of the maximum visible distance Dmax.

Therefore, in addition to the first mode, the second mode in which the camera imaging information IMG is not used is prepared. In the second mode, the maximum visible distance Dmax is set to a predetermined value. As the predetermined value, a value that is reliable as the maximum visible distance Dmax is used.

For example, an irradiation distance of the low beam or the high beam is determined in advance. Specifically, the irradiation distance of the low beam is 40 m, and the irradiation distance of the high beam is 100 m. Such a predetermined irradiation distance can become the predetermined value that is reliable as the maximum visible distance Dmax. For example, in a case of the high beam, it is considered that a range of the irradiation distance is visible by the camera 112. That is, the irradiation distance of the high beam can be regarded as the maximum visible distance Dmax.

Figure 8:
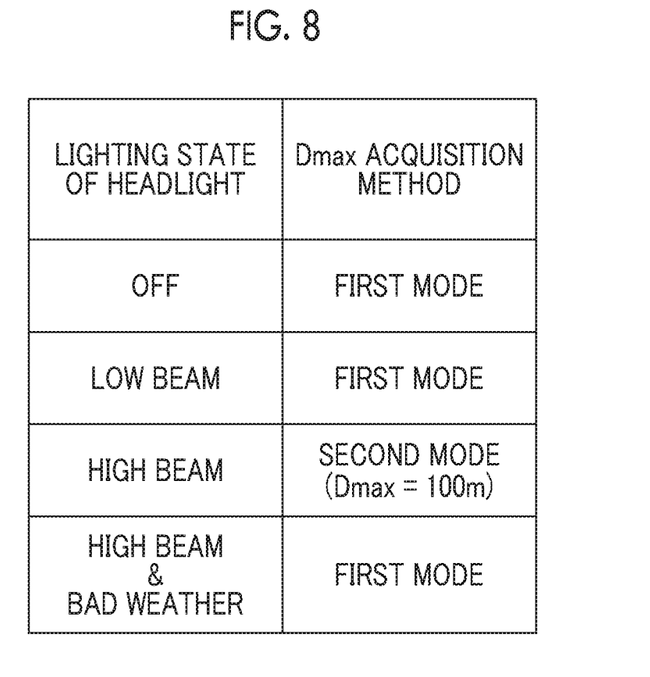
FIG. 8 is a conceptual diagram illustrating an acquisition method of a maximum visible distance in the second embodiment.

From the above viewpoint, according to the embodiment, the acquisition method of the maximum visible distance Dmax is selected according to the lighting state of the headlight 220. FIG. 8 shows an example of selection of the acquisition method of the maximum visible distance Dmax.

In a case where the lighting state of the headlight 220 is "off (non-lighted)", the first mode is selected.

In a case where the lighting state of the headlight 220 is the "low beam", the vehicle 1 is in various situations. For example, the vehicle 1 may be in an urban area or a preceding vehicle may be present in front of the vehicle 1. In this case, the irradiation distance (40 m) of the low beam is not limited as coinciding with the maximum visible distance Dmax. Accordingly, the first mode is selected.

In a case where the lighting state of the headlight 220 is the "high beam", there is a high possibility that a preceding vehicle or an oncoming vehicle is not present in front of the vehicle 1. Accordingly, it is considered that the irradiation distance (100 m) of the high beam coincides with the maximum visible distance Dmax. As described above, in a case where the maximum visible distance Dmax is estimated based on the camera imaging information IMG, the longer the maximum visible distance Dmax, the lower the estimation accuracy. Consequently, the second mode is selected. That is, the maximum visible distance Dmax is set to the irradiation distance of the high beam. Alternatively, the maximum visible distance Dmax may be set to a distance slightly shorter than the irradiation distance of the high beam. Since the reliable predetermined value, instead of the estimated value based on the camera imaging information IMG, is used as the maximum visible distance Dmax, a probability (accuracy or reliability) of the maximum visible distance Dmax is improved.

In a case of bad weather (rain, snow, fog, sleet, or the like), a view is bad. Even in the high beam, it is not possible to confirm 100 m ahead. Accordingly, the first mode is selected.

2-3. Processing in Vehicle Control System

Figure 9:
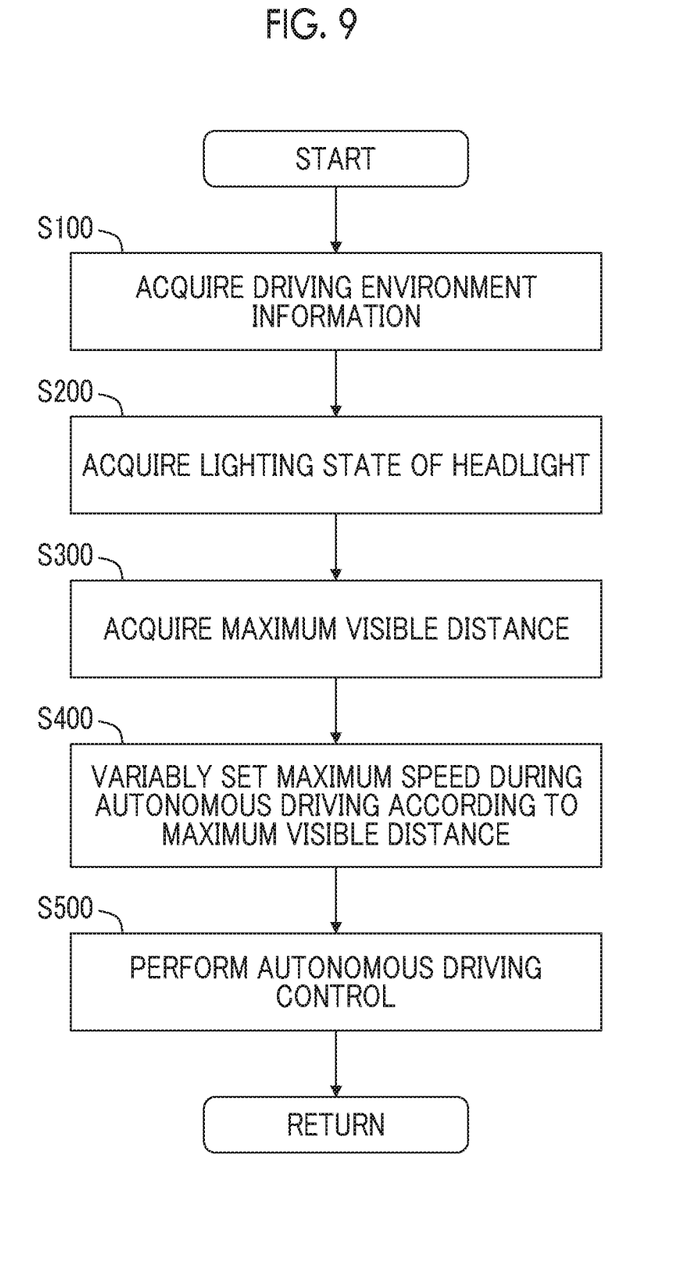
FIG. 9 is a flowchart showing processing in the vehicle control system according to the second embodiment.

FIG. 9 is a flowchart showing processing in the vehicle control system 10 according to the embodiment. Description overlapping the first embodiment (FIG. 6) will not be repeated. In comparison with the processing flow shown in FIG. 6, Step S200 is added between Step S100 and Step S300.

In Step S200, the headlight control device 200 sends the lighting state signal CON indicating the lighting state of the headlight 220 to the autonomous driving control device 100. The autonomous driving control device 100 receives the lighting state signal CON and recognizes the lighting state of the headlight 220. The lighting state of the headlight 220 includes on and off, the high beam and the low beam (light distribution state), and the occurrence of an abnormality.

In Step S300, the autonomous driving control device 100 acquires the maximum visible distance Dmax of the camera 112 based on the driving environment information ENV and the lighting state signal CON. In this case, the autonomous driving control device 100 switches the acquisition method (the first mode and the second mode) of the maximum visible distance Dmax according to the lighting state of the headlight 220.

Figure 10:
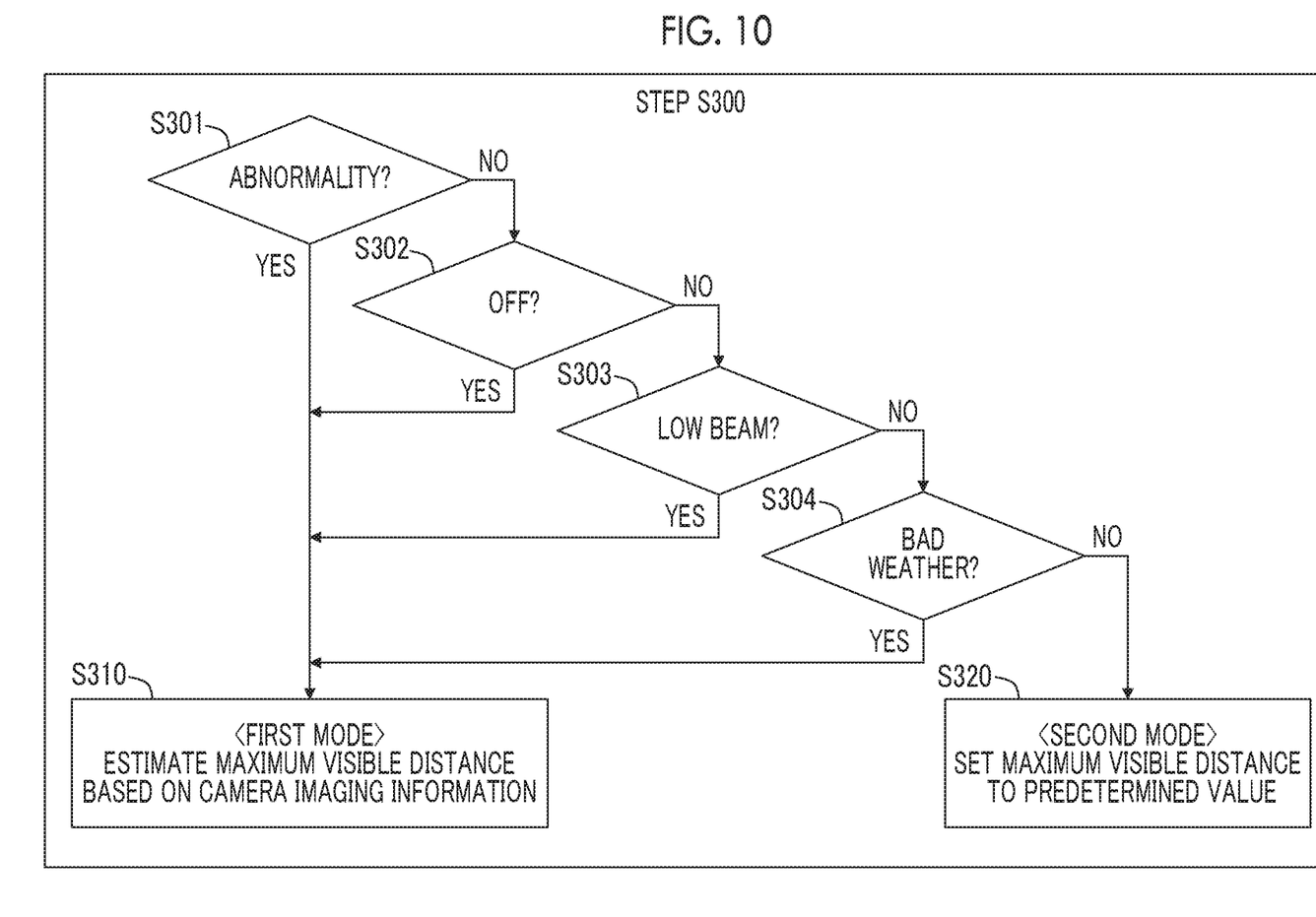
FIG. 10 is a flowchart showing an example of Step S300 according to the second embodiment.

FIG. 10 is a flowchart showing an example of Step S300 according to the embodiment.

In Step S301, the autonomous driving control device 100 determines whether or not the lighting state signal CON indicates the occurrence of an abnormality. In a case where the lighting state signal CON indicates the occurrence of an abnormality (Step S301: Yes), the process progresses to Step S310. Otherwise (Step S301: No), the process progresses to Step S302.

In Step S302, the autonomous driving control device 100 determines whether or not the lighting state is "off (non-lighted)". In a case where the lighting state is "off" (Step S302: Yes), the process progresses to Step S310. In a case where the lighting state is "on" (Step S302: No), the process progresses to Step S303.

In Step S303, the autonomous driving control device 100 determines whether or not the lighting state is the "low beam". In a case where the lighting state is the "low beam" (Step S303: Yes), the process progresses to Step S310. In a case where the lighting state is the "high beam" (Step S303: No), the process progresses to Step S304.

In Step S304, the autonomous driving control device 100 determines whether or not the weather state surrounding the vehicle 1 is the bad weather state based on the driving environment information ENV. The bad weather state means that a level of bad weather exceeds a threshold. Bad weather includes at least one of rain, snow, fog, and sleet.

For example, determination regarding whether or not the weather state is the bad weather state is performed based on the camera imaging information IMG. Specifically, machine learning is performed using many combinations of the camera imaging information IMG (input) and correct answer data (output), whereby a bad weather determination model is created. The camera imaging information IMG is input to the created bad weather determination model, whereby it is possible to determine whether or not the weather state is the bad weather state.

As another example, in a case where the vehicle state information STA includes the operation state of the windshield wiper, the operation state may be used for the determination. Specifically, in a case where the windshield wiper is operated, determination is made that the weather state is the bad weather state. As still another example, weather information included in the distribution information DEL may be used for the determination.

In a case where the weather state is the bad weather state (Step S304: Yes), the process progresses to Step S310. Otherwise (Step S304: No), the process progresses to Step S320.

In Step S310, the autonomous driving control device 100 selects the first mode. That is, the autonomous driving control device 100 estimates the maximum visible distance Dmax based on the camera imaging information IMG.

In Step S320, the autonomous driving control device 100 selects the second mode. That is, the autonomous driving control device 100 sets the maximum visible distance Dmax to a predetermined value without using the camera imaging information IMG. The predetermined value is the irradiation distance (100 m) of the high beam. Alternatively, the predetermined value may be a value slightly shorter than the irradiation distance of the high beam.

2-4. Effects

According to the embodiment, the method of acquiring the maximum visible distance Dmax includes the first mode in which the camera imaging information IMG is used and the second mode in which the camera imaging information IMG is not used. The autonomous driving control device 100 switches between the first mode and the second mode according to the lighting state of the headlight 220. With this, it is possible to more flexibly acquire the maximum visible distance Dmax.

In particular, in a case where the lighting state of the headlight 220 is the high beam, and the weather state is not the bad weather state, the irradiation distance of the high beam can be regarded as the maximum visible distance Dmax. Accordingly, the second mode is selected. In this case, the irradiation distance of the high beam, instead of the estimated value based on the camera imaging information IMG, is used as the maximum visible distance Dmax. Accordingly, the probability (accuracy or reliability) of the maximum visible distance Dmax is improved. While the longer the maximum visible distance Dmax, the lower the estimation accuracy based on the camera imaging information IMG, the second mode is selected, whereby such a problem is solved. In a case where the probability of the maximum visible distance Dmax is improved, the setting accuracy of the maximum speed Vmax is also improved. This contributes to improvement of the accuracy of the autonomous driving control.

What is claimed is:

1. A vehicle control system that is mounted in a vehicle, the vehicle control system comprising:
   a camera configured to image a situation in front of the vehicle to acquire camera imaging information indicating an imaging result; and
   an autonomous driving control device configured to control autonomous driving of the vehicle based on the camera imaging information and decide a maximum speed of the vehicle in the middle of the autonomous driving,
   wherein the autonomous driving control device is configured to
      estimate a maximum visible distance of the camera based on the camera imaging information, and
      variably set the maximum speed according to the maximum visible distance, variably setting the maximum speed includes increasing the maximum speed that is set based on an increase in the maximum visible distance.

2. The vehicle control system according to claim 1, further comprising a headlight control device configured to control a lighting state of a headlight of the vehicle, wherein:
   the headlight control device is configured to send a lighting state signal indicating the lighting state to the autonomous driving control device; and
   the autonomous driving control device is configured to
      estimate the maximum visible distance based on the camera imaging information in a first mode,
      set the maximum visible distance to a predetermined value without using the camera imaging information in a second mode, and
      switch between the first mode and the second mode according to the lighting state.

3. The vehicle control system according to claim 2, wherein the autonomous driving control device is configured to select the first mode in a case where the lighting state is non-lighted or a low beam.

4. The vehicle control system according to claim 2, further comprising information acquisition device configured to acquire driving environment information indicating a driving environment of the vehicle, wherein:
   the autonomous driving control device is configured to determine whether or not a weather state around the vehicle is a bad weather state based on the driving environment information;
   the autonomous driving control device is configured to select the first mode in a case where the lighting state is a high beam, and the weather state is the bad weather state; and
   the autonomous driving control device is configured to select the second mode in a case where the lighting state is the high beam, and the weather state is not the bad weather state.

5. The vehicle control system according to claim 4, wherein the predetermined value is an irradiation distance of the high beam.

6. A vehicle control system that is mounted in a vehicle, the vehicle control system comprising:
   an information acquisition device configured to acquire driving environment information indicating a driving environment of the vehicle;
   a camera configured to image a situation in front of the vehicle to acquire camera imaging information indicating an imaging result;
   an autonomous driving control device configured to control autonomous driving of the vehicle based on the camera imaging information and decide a maximum speed of the vehicle in the middle of the autonomous driving; and
   a headlight control device configured to control a lighting state of a headlight of the vehicle, the headlight control device is configured to send a lighting state signal indicating the lighting state to the autonomous driving control device,
   wherein the autonomous driving control device is configured to:
      estimate a maximum visible distance of the camera based on the camera imaging information,
      variably set the maximum speed according to the maximum visible distance such that the maximum speed in a case where the maximum visible distance is long becomes higher than the maximum speed in a case where the maximum visible distance is short,
      estimate the maximum visible distance based on the camera imaging information in a first mode,
      set the maximum visible distance to a predetermined value without using the camera imaging information in a second mode,
      switch between the first mode and the second mode according to the lighting state,
      determine whether or not a weather state around the vehicle is a bad weather state based on the driving environment information,
      select the first mode in a case where the lighting state is a high beam, and the weather state is the bad weather state, and
      select the second mode in a case where the lighting state is the high beam, and the weather state is not the bad weather state.

7. The vehicle control system according to claim 6, wherein the predetermined value is an irradiation distance of the high beam.

* * * * *